United States Patent
Spitzer

(10) Patent No.: US 7,945,261 B1
(45) Date of Patent: May 17, 2011

(54) SYSTEMS AND METHODS FOR PROVISIONING AND SYNCHRONIZING WIRELESS SUBSCRIBER DATA

(75) Inventor: Roy Leo Spitzer, Rockville, MD (US)

(73) Assignee: Nextel Communications Inc., Reston, VA (US)

(*) Notice: Subject to any disclaimer, the term of this patent is extended or adjusted under 35 U.S.C. 154(b) by 1045 days.

(21) Appl. No.: 11/338,660

(22) Filed: Jan. 25, 2006

(51) Int. Cl.
*H04W 4/00* (2009.01)
(52) U.S. Cl. .................. 455/433; 455/436; 370/331
(58) Field of Classification Search .............. 455/433, 455/432.3, 436–444; 370/331
See application file for complete search history.

(56) References Cited

U.S. PATENT DOCUMENTS

| | | | | |
|---|---|---|---|---|
| 5,771,275 A | * | 6/1998 | Brunner et al. | 370/385 |
| 5,862,481 A | * | 1/1999 | Kulkarni et al. | 455/432.2 |
| 5,898,922 A | * | 4/1999 | Reininghaus | 455/433 |
| 5,953,662 A | * | 9/1999 | Lindquist et al. | 455/433 |
| 6,002,932 A | * | 12/1999 | Kingdon et al. | 455/433 |
| 6,453,163 B1 | * | 9/2002 | Karapetkov et al. | 455/433 |
| 6,697,621 B2 | * | 2/2004 | Taha et al. | 455/433 |
| 7,120,451 B2 | * | 10/2006 | Agarwal et al. | 455/456.2 |
| 7,289,522 B2 | * | 10/2007 | Gallant | 370/401 |
| 7,292,853 B2 | * | 11/2007 | Nam et al. | 455/433 |
| 2005/0101327 A1 | * | 5/2005 | Nam et al. | 455/436 |

* cited by examiner

*Primary Examiner* — Kamran Afshar
*Assistant Examiner* — Vladimir Magloire

(57) ABSTRACT

Systems and methods for provisioning and synchronizing subscriber data are provided. Subscriber data is provisioned in two home location registers, each located in a different wireless network. When the subscriber registers in one of the wireless networks, the subscriber data is obtained from the local home location register. One of the two home location registers is designated as the owning home location register. Updates of subscriber data are performed with the owning home location register, which then updates the other home location register.

14 Claims, 4 Drawing Sheets

SYSTEMS AND METHODS FOR PROVISIONING AND SYNCHRONIZING WIRELESS SUBSCRIBER DATA

BACKGROUND OF THE INVENTION

Communication networks include registers, such as home location registers (HLRs) and visitor location registers (VLRs), that store data related to subscribers to the particular communication network. This data identifies whether the subscriber subscribes to particular services and whether there are any restrictions on the subscriber. This data also includes the subscriber policy, which governs the overall operational behavior of the subscriber. Typically, the subscriber policy is relatively static. In some systems, a subscriber may be provisioned to operate primarily in a master network, and optionally in one or more slave networks. Because policies are typically static, in these systems the slave networks may cache the policy in their own visitor location register to minimize access overhead to the home location register.

FIG. 1 illustrates a conventional wireless communication system, which includes a first network 110 and a second network 150. The first network 110 includes two or more base transceiver stations 115a and 115b coupled to a mobile switching center (MSC) 120. Subscriber data for mobile stations supported by MSC 120 is stored in home location register (HLR) 130 and/or visitor location register (VLR) 135. Similarly, the second network 150 includes two or more base transceiver stations 155a and 155b coupled to mobile switching center 160. In the second network 150, subscriber data for mobile station supported by mobile switching center 160 is stored in home location register 170 and/or visitor location register 175.

A home location register stores subscriber data for subscribers of that particular network, while a visitor location register stores data for subscribers roaming from other networks. Assume that a mobile station is a subscriber in the first network 110 and is registering in the second network 150. The mobile station's subscriber data is stored in home location register 130. Typically, the mobile station sends a registration request a base transceiver station in the second network 150, which in turn forwards the registration request to mobile switching center 160. Based on the registration request, mobile switching center 160 recognizes that the mobile station is a subscriber in the first network 110, and sends a request for the subscriber data to mobile switching center 120. Mobile switching center 120 retrieves the subscriber data from home location register 130 and forwards the subscriber data to mobile switching center 160. Mobile switching center 160 then stores the subscriber data in visitor location register 175.

SUMMARY OF THE INVENTION

In conventional communication systems, where subscriber data is stored in only one home location register, there is a delay in obtaining subscriber data in a visited network from the subscriber's home location register. During a handover between two different networks, this delay can result in a dropped call. Even during registration, this delay may be perceptible to the subscriber, possibly leading to subscriber dissatisfaction. In order to minimize this delay, conventional communication systems cache subscriber data in a visitor location register, which may be effective in fairly static subscriber environments. However, caching of data in a visitor location register may result in the data not reflecting current subscriber policies, when such policies change frequently.

In one conventional communication system subscriber data is stored in two home location registers, and a signaling transfer point (STP) includes a record for each subscriber indicating which home location register contains the most up-to-date information on the subscriber location. However, this conventional system does not allow for policies of one network to be implemented in another network. As used herein, polices can include dialing plans, such as the format (i.e., number of digits) used for contacting mobile stations. Additionally, this system requires a large database for the signaling transfer point. Moreover, call termination requires additional ports because more switches may need to be traversed before the visited mobile switching center is reached.

In view of the above-identified and other deficiencies of conventional wireless communication systems, the present invention provides systems and methods for provisioning and synchronizing subscriber data in different home location registers. In particular, subscriber data is stored in home location registers of two networks. When the subscriber registers in one of the two networks, the subscriber data is obtained from the local home location register. One of the two home location registers is designated as the owning home location register. When an update to the subscriber data is required, the data is updated first in the owning home location register, which then updates the subscriber data in the second home location register.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

In accordance with exemplary embodiments of the present invention, subscriber data can be stored in multiple different home location registers in different wireless communication networks. The wireless communication networks can be public wireless macro networks, private wireless networks and/or the like. Because subscriber data is stored in multiple home location registers, the data must be synchronized in some manner.

Figure 1:
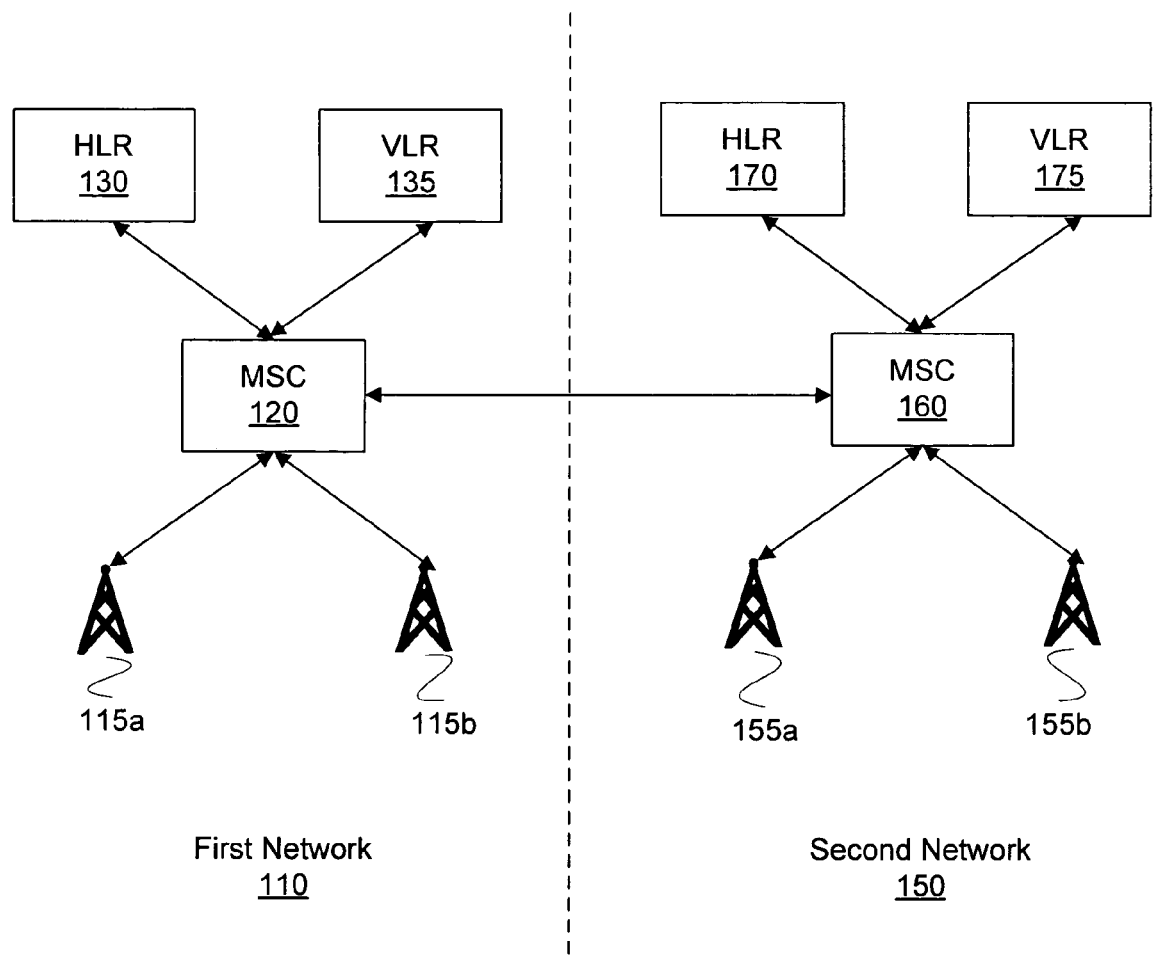
FIG. 1 is a block diagram illustrating a conventional wireless communication system.

Because in the present invention the subscriber policies are synchronized among networks, the home location register of each of the cooperating networks stores subscriber data for all subscribers. In accordance with the present invention, the visitor location register is not used to support subscribers with synchronized policies on multiple networks. Referring again to FIG. 1, assume that a mobile station is a subscriber of the first network 110 and is registering in the second network 150. The mobile station's subscriber data is stored in the home location register 170. When the mobile station sends a registration request to a base transceiver station in the second network 150, the base transceiver station forwards the registration request to mobile switching center 160. Due to the synchronization techniques disclosed herein, mobile switching center 160 need not recognize the home network because all synchronized home location registers have the appropriate policy. Additionally, the present invention can also provide network specific policies.

Figure 2:
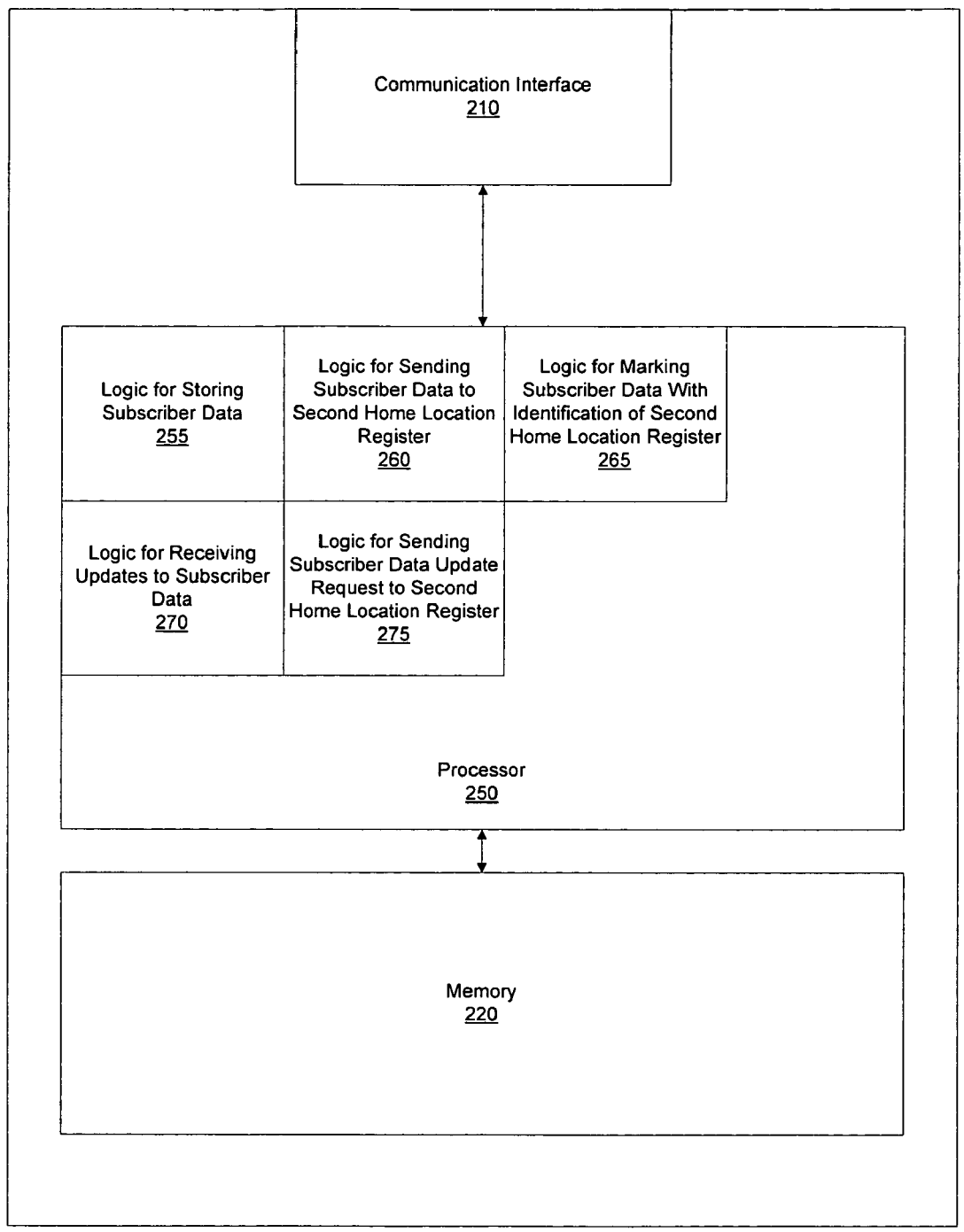
FIG. 2 is a block diagram illustrating an exemplary home location register in accordance with the present invention.

FIG. 2 is a block diagram illustrating an exemplary home location register in accordance with the present invention. The home location register includes a processor 250 coupled to a communication interface 210 and memory 220. The communication interface 210 is a conventional communication interface for communications between the home location register and other network entities, such as the mobile switching center. Communication interface 210 can also be used to access the home location register for provisioning or updating subscriber data.

Memory 220 can be any conventional type of memory, including a hard drive, flash memory, read only memory, and/or random access memory. The processor 250 can be a microprocessor executing computer-readable instructions, an application specific integrated circuit (ASIC), field programmable gate array (FPGA), hard-wired logic, and/or the like. Processor 250 includes logic for storing subscriber data 255, sending subscriber data to the second home location register 260, marking subscriber data 265, receiving updates to subscriber data 270 and sending subscriber data updates to the second home location register 275, all of which will be described in more detail below in connection with FIGS. 3 and 4.

Figure 3:
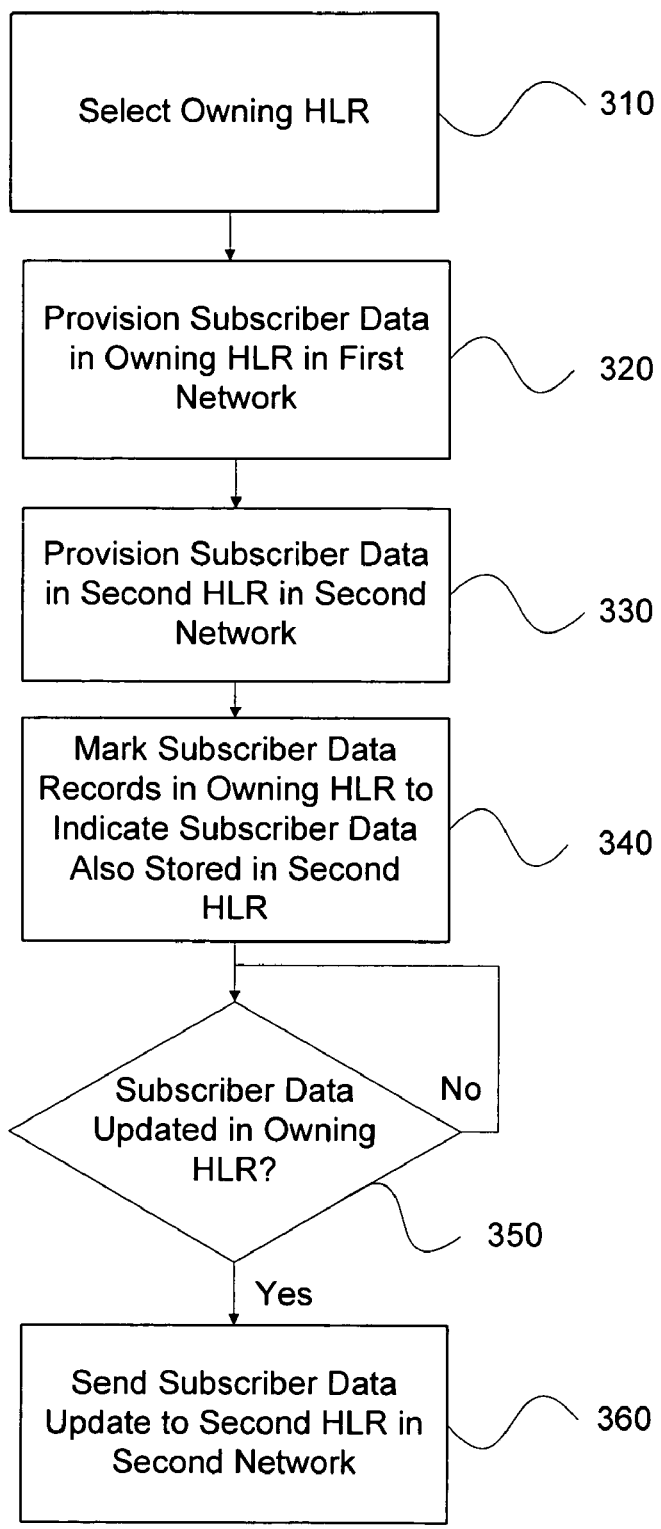
FIG. 3 is a flow chart illustrating an exemplary method for provisioning subscriber data in accordance with the present invention.

FIG. 3 is a flow diagram illustrating an exemplary method for provisioning subscriber data in two home location registers. Initially, one of the multiple home location registers is selected as the "owning" home location register (step 310). The owning home location register is the home location register that receives updates for the subscriber data from a wireless network service provider, via communication interface 210 and logic for receiving updates 270, and forwards the updated data to other home location register(s). Once an owning home location register has been selected, the subscriber data is provisioned in the home location registers in the first and second networks (steps 320 and 330). The subscriber data can be provisioned in the owning home location register using logic for storing subscriber data 255. The subscriber data can be provisioned in the home location register of the second network (i.e., the non-owning home location register) by a wireless network operator using conventional techniques, or can be provisioned by the owning home location register via logic for sending subscriber data 260 using, for example, an add user command.

The subscriber data record in the owning home location register is marked with an identification of the second home location register that includes the subscriber data, using logic for marking subscriber data 265, to indicate that the subscriber data records are also stored in the second home location register (step 340). When the subscriber data is updated in the owning home location register ("Yes" path out of decision step 350), then the updated subscriber data is sent to the second home location register, using logic for sending subscriber data update request 275 (step 360). The updated subscriber data can include only that data being updated, along with an identification of the associated subscriber, or can be the entire subscriber data record. The subscriber data update can include any type of update, such as, new or updated policies, removing the subscriber data record, long distance calling capabilities and/or mobility access capabilities.

Updating the subscriber data only when there has been a change to the subscriber data reduces the amount of network traffic between the two networks, compared to the amount of network traffic used for transferring subscriber data between the home location register of a first network and a visitor location register of a second network. Additionally, the time required for a mobile switching center to obtain the subscriber data is reduced because the subscriber data is stored in the home location register of both networks.

Figure 4:
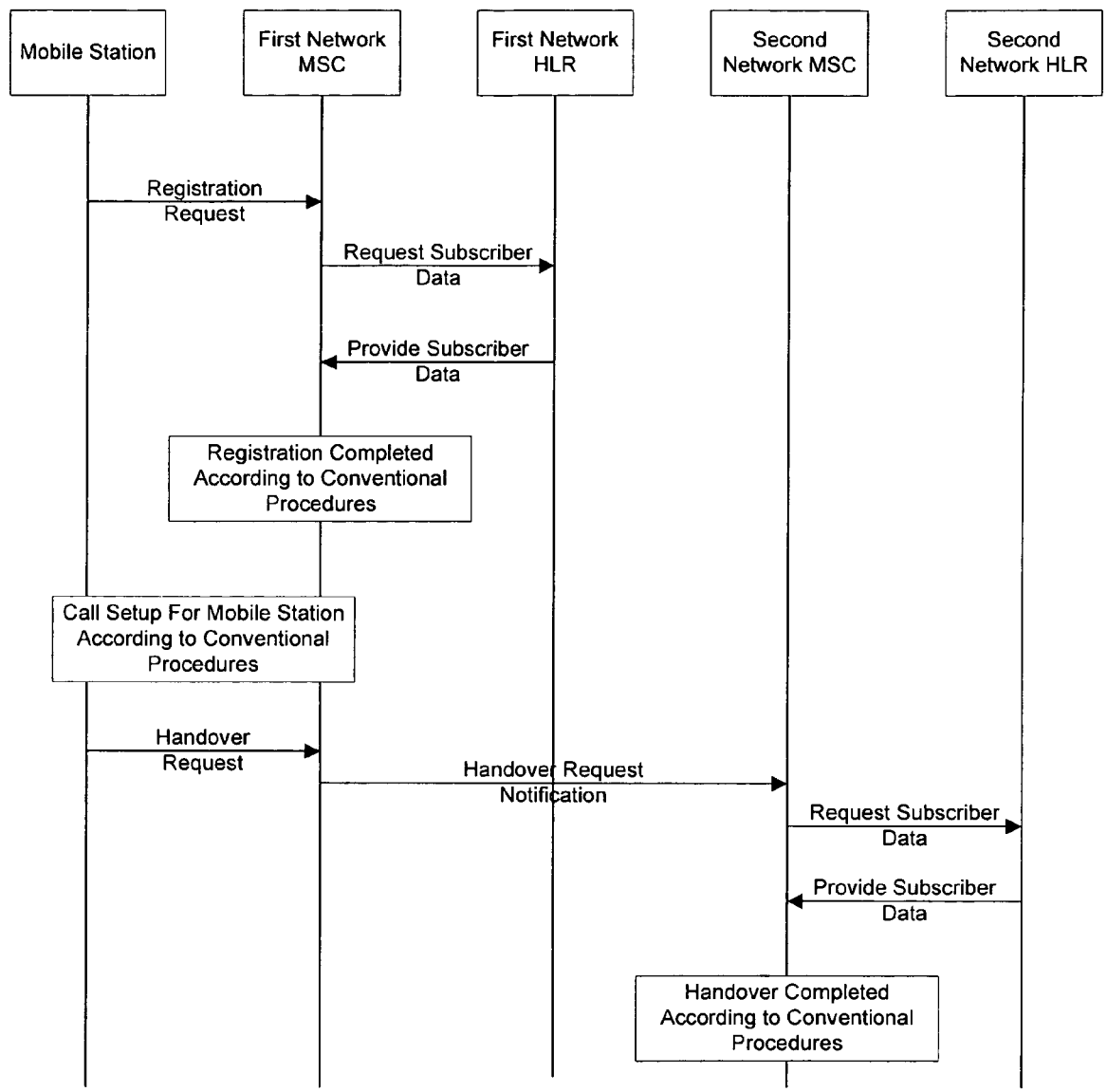
FIG. 4 is a call flow diagram illustrating an exemplary method for retrieving subscriber data in accordance with exemplary embodiments of the present invention.

FIG. 4 is a call flow diagram illustrating an exemplary method for retrieving subscriber data in accordance with exemplary embodiments of the present invention. When the mobile station sends a registration request to the first network mobile switching center, the mobile switching center requests the subscriber's data from the first network home location register. The first network home location register provides the subscriber data to the first network mobile switching center, which the completes the registration process according to conventional procedures. Once the registration process has completed, the mobile station can establish a call in the first network.

Assume now that the mobile station has roamed into an area of the second network. Accordingly, the mobile station sends a handover request message to the first mobile switching center, which in turn sends a handover request message to the second network mobile switching center. The second network mobile switching center can request the subscriber data from the second network home location register, which responds with the subscriber's data. Accordingly, when the mobile station completes the handover from the first network to the second network, the subscriber data associated with the mobile station is present in the second network mobile switching center.

Although FIG. 4 has been described in connection with a call handover request initiated by the mobile station, the present invention is equally applicable to network initiated handover, or any other type of handover. Additionally, the present invention is also applicable to a mobile station, not currently on a call, that roams from the first network to the second network.

Providing the subscriber data in home location registers in two network has a number of advantages. For example, the mobile station can operate using the dialing plan of the network including the owning home location register. Specifically, because the non-owning network's mobile switching center receives the subscriber data (including policies) from the non-owning home location register, the mobile switching center will have the information about the owning network's dialing plan, and with knowledge of its own network's dialing plan can translate the dialed digits into the appropriate format for completing the call in the non-owning network. Moreover, policy updates are not constrained by caching mechanisms employed by the associated networks.

Although exemplary embodiments of the present invention have been described in connection with a system with two networks and two home location registers, the present invention can be implemented in a number of different networks each with its own home location register.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for provisioning wireless network subscriber data, the method comprising the acts of:
provisioning the subscriber data in a first home location register in a first network;
provisioning the subscriber data in a second home location register in a second network;
designating one of the first and second home location registers as an owning home location register;

marking the subscriber data in the owning home location register with an identification of another home location register that includes the subscriber data, wherein the owning home location register is a home location register that receives updates for the subscriber data from a wireless network service provider and forwards the updated data to other home location registers;

synchronizing the subscriber data in the first and second home location registers;

receiving, by a mobile switching center in the first network, a call setup request from a mobile station associated with the subscriber data;

accessing, by the mobile switching center in the first network, the subscriber data from the first home location register;

receiving, by a mobile switching center in the second network, a call handoff request associated with the mobile station; and accessing, by the mobile switching center in the second network, the subscriber data from the second home location register, wherein the first network is a wireless macro network and the second network is a private wireless network.

2. The method of claim 1, wherein the act of synchronizing further comprises the acts of:

receiving, by the first home location register, an update to the subscriber data; and sending an update request to the second home location register.

3. The method of claim 1, wherein the act of provisioning the subscriber data in the second home location register comprises the act of:

sending a request to add a subscriber from the first home location register to the second home location register.

4. The method of claim 1, further comprising the acts of:

requesting, by the first home location register, removal of the subscriber data from the second home location register.

5. A method for provisioning wireless network subscriber data, the method comprising the acts of:

provisioning the subscriber data in a first home location register in a first network;

provisioning the subscriber data in a second home location register in a second network;

synchronizing the subscriber data in the first and second home location registers;

designating one of the first and second home location registers as an owning home location register;

receiving, by a mobile switching center in the first network, a call setup request from a mobile station associated with the subscriber data;

accessing, by the mobile switching center in the first network, the subscriber data from the first home location register;

receiving, by a mobile switching center in the second network, a call handoff request associated with the mobile station; and accessing, by the mobile switching center in the second network, the subscriber data from the second home location register, wherein the first and second networks are wireless macro networks.

6. The method of claim 5, further comprising the act of:

marking the subscriber data in the owning home location register with an identification of another home location register that includes the subscriber data.

7. The method of claim 5, wherein the act of synchronizing further comprises the acts of:

receiving, by the first home location register, an update to the subscriber data; and sending an update request to the second home location register.

8. The method of claim 5, wherein the act of provisioning the subscriber data in the second home location register comprises the act of:

sending a request to add a subscriber from the first home location register to the second home location register.

9. The method of claim 5, further comprising the acts of:

requesting, by the first home location register, removal of the subscriber data from the second home location register.

10. A method for provisioning wireless network subscriber data, the method comprising the acts of:

provisioning the subscriber data in a first home location register in a first network;

provisioning the subscriber data in a second home location register in a second network;

synchronizing the subscriber data in the first and second home location registers;

designating one of the first and second home location registers as an owning home location register;

receiving, by a mobile switching center in the first network, a call setup request from a mobile station associated with the subscriber data, wherein the first and second wireless networks operate using different numbering plans, the call setup request includes a telephone number formatted according to a numbering plan for the second network, and the call is setup by the mobile switching center in the first network using the telephone number in the call setup request;

accessing, by the mobile switching center in the first network, the subscriber data from the first home location register;

receiving, by a mobile switching center in the second network, a call handoff request associated with the mobile station; and accessing, by the mobile switching center in the second network, the subscriber data from the second home location register.

11. The method of claim 10, further comprising the act of:

marking the subscriber data in the owning home location register with an identification of another home location register that includes the subscriber data.

12. The method of claim 10, wherein the act of synchronizing further comprises the acts of:

receiving, by the first home location register, an update to the subscriber data; and sending an update request to the second home location register.

13. The method of claim 10, wherein the act of provisioning the subscriber data in the second home location register comprises the act of:

sending a request to add a subscriber from the first home location register to the second home location register.

14. The method of claim 10, further comprising the acts of:

requesting, by the first home location register, removal of the subscriber data from the second home location register.

* * * * *